United States Patent
Weber

(10) Patent No.: US 6,209,064 B1
(45) Date of Patent: Mar. 27, 2001

(54) CACHE COHERENCE UNIT WITH INTEGRATED MESSAGE PASSING AND MEMORY PROTECTION FOR A DISTRIBUTED, SHARED MEMORY MULTIPROCESSOR SYSTEM

(75) Inventor: Wolf-Dietrich Weber, La Honda, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/003,721

(22) Filed: Jan. 7, 1998

(51) Int. Cl.$^7$ .............................. G06F 15/16; G06F 15/17
(52) U.S. Cl. .................... 711/141; 711/100; 711/173; 711/202; 711/205; 711/206; 711/221
(58) Field of Search ................................... 711/100, 173, 711/202, 205, 206, 207, 221

(56) References Cited

U.S. PATENT DOCUMENTS

| | | | |
|---|---|---|---|
| 5,117,350 | * 5/1992 | Parrish et al. ...................... | 395/425 |
| 5,230,051 | * 7/1993 | Quan .................................. | 395/700 |
| 5,428,803 | * 6/1995 | Chen et al. ......................... | 395/800 |
| 5,448,698 | 9/1995 | Wilkes ............................. | 395/200.01 |
| 5,515,525 | * 5/1996 | Grynberg et al. .................. | 395/500 |
| 5,592,625 | * 1/1997 | Sandberg . | |
| 5,617,537 | * 4/1997 | Yamada et al. ................. | 395/200.01 |
| 5,752,249 | * 5/1998 | Macon, Jr. et al. . | |
| 5,787,300 | * 7/1998 | Wijaya . | |
| 5,805,913 | * 9/1998 | Guttag et al. ....................... | 395/800 |
| 5,845,331 | * 12/1998 | Carter et al. ....................... | 711/163 |
| 5,850,632 | * 12/1998 | Robertson ........................... | 711/170 |
| 5,890,189 | * 3/1999 | Nozue ................................ | 711/100 |
| 5,890,217 | * 3/1999 | Kabemoto et al. . | |
| 5,901,328 | * 5/1999 | Ooe .................................... | 395/825 |
| 6,003,123 | * 1/1997 | Carter et al. ....................... | 711/207 |

FOREIGN PATENT DOCUMENTS

| | | |
|---|---|---|
| 0489583 | 6/1992 | (EP) . |
| 0801349 | 10/1997 | (EP) . |

* cited by examiner

Primary Examiner—Mark H. Rinehart
Assistant Examiner—Stephan Willett
(74) Attorney, Agent, or Firm—Carr & Ferrell LLP

(57) ABSTRACT

The present invention generally relates to a system and method for a message protocol to extend cache coherence management of scalable shared memory multiprocessing computer systems having a plurality of processors connected to an interconnection over which the plurality of processors communicate with each other. Each processor communicates with other interconnection processors by sending and receiving messages on the interconnection by means of a messaging protocol which can be used for shared-memory computer systems, shared nothing computer systems, and hybrid computer systems in which some processors are sharing memory while others are not. With this invention a processor node is able to tell whether an incoming message is from within the same coherence group (in which case it is completely unprotected) or whether it is from outside the coherence group (in which case the shared-nothing protections apply). This allows processor nodes sharing memory and processor nodes sharing nothing to co-exist on the same interconnection.

8 Claims, 3 Drawing Sheets

CACHE COHERENCE UNIT WITH INTEGRATED MESSAGE PASSING AND MEMORY PROTECTION FOR A DISTRIBUTED, SHARED MEMORY MULTIPROCESSOR SYSTEM

CROSS-REFERENCE TO CO-PENDING APPLICATION

This application is related to co-pending application Ser. No. 09/003,771, filed Jan. 7, 1998, entitled, "Memory Protection Mechanism for a Distributed Shared Memory Multiprocessor With Integrated Message Passing Support," by inventors Wolf-Dietrich Weber and Jaspal Kohli, to common assignee.

BACKGROUND OF THE INVENTION

1. Field of the Invention

The present invention relates generally to computer communication protocols, and more specifically to an integrated protocol that supports both shared memory cache coherence and protected shared nothing message passing.

2. Description of Background Art

One class of multi-processor data computer system consists of a plurality of processor nodes communicating over a high-speed interconnection. Each processor node typically includes a processor and local Random Access Memory (RAM). A computational problem may be divided among processor nodes to use the particular resources available at different processor nodes or to reduce the real time needed to produce a result and thereby expedite the computation. Hence, a process running on one processor node may depend on computations being performed at other processor nodes in the computer system. The various processes communicate over the interconnection to exchange information and synchronize the processes.

There are two major multiprocessor programming paradigms that differ by how the processors communicate with one another. The shared memory paradigm allows all processors to access all memory in the entire machine. Processors communicate with each other by one processor writing a value to a given memory location and another processor reading that value from the same memory location. In contrast, in the shared nothing (or message-passing) paradigm, each processor can only access its own memory, and communicates with other processors by explicitly building messages and sending them to the other processor. Both programming paradigms have their relative merits and both are used. An advantage of the shared-memory paradigm is that it offers more efficient communication, whereas an advantage of the shared-nothing paradigm is that it offers greater protection of one process from all other processes.

Prior art systems usually allow only one or the other programming paradigm. If both are allowed, then they are usually supported over two different types of interconnects, usually a high-performance interconnect for shared memory and the associated cache coherence protocol, and a lower-performance interconnect for message-passing.

SUMMARY OF THE INVENTION

The objects of the present invention include the integration of a shared memory cache coherence protocol and a shared nothing message passing protocol onto the same high-performance interconnect and to raise protection boundaries between processors not sharing memory while allowing complete access to processors sharing memory.

The invention resides in a system and method for a message passing protocol to extend cache coherence management of scalable shared-memory multiprocessing computer systems. The scalable shared-memory multiprocessing computer system has a plurality of processors connected to an interconnection over which the processors communicate between themselves. The interconnection processors use a communication protocol which is adaptable for shared-memory computer systems, shared nothing computer systems, and hybrid computer systems in which some processors share memory while others do not, to send and receive messages on the interconnection. For hybrid computer systems it is important to raise protection boundaries between processors not sharing memory while allowing complete access to processors sharing memory. A processor node is able to tell whether an incoming message is from within the same coherence group (in which case it is completely unprotected) or is from outside the coherence group (in which case the shared-nothing protections apply). This allows processor nodes sharing memory and processor nodes sharing nothing to co-exist on the same interconnection. This is achieved by using node identification numbers (NIDs), coherence node numbers (CNNs), and a mapping between them. Each processing node in the system is given a NID. Nodes in a set which will share memory are each assigned a CNN and agree on a consistent mapping of CNNs to NIDs. With this mapping a processor node is able to tell whether an incoming message is from within the same coherence group (in which case it is completely unprotected) or is from outside the coherence group (in which case the shared-nothing protections apply). This allows processor nodes sharing memory and processor nodes sharing nothing to co-exist on a common interconnection.

These and other objects and advantages of the present invention will become apparent to those skilled in the art from the following detailed description of the invention and the accompanying drawings.

DETAILED DESCRIPTION OF THE PREFERRED EMBODIMENT

The present invention resides in a system and method for integrating a message passing protocol and the required protection boundaries into a scalable shared-memory multiprocessing computer system. A scalable shared-memory multiprocessing computer system has a plurality of processors connected to an interconnection over which the processors communicate with each other. The traditional mechanism by which a message is passed via an input/output channel and an interconnection. In contrast, the present invention uses the same communication channel, an interconnection, for both cache coherence and message passing, which significantly increases the rate at which messages may be exchanged. Each processor communicates with other interconnection processors by sending and receiving messages using a messaging protocol that is tightly integrated with the inter-processor node cache coherence protocol.

Figure 1:
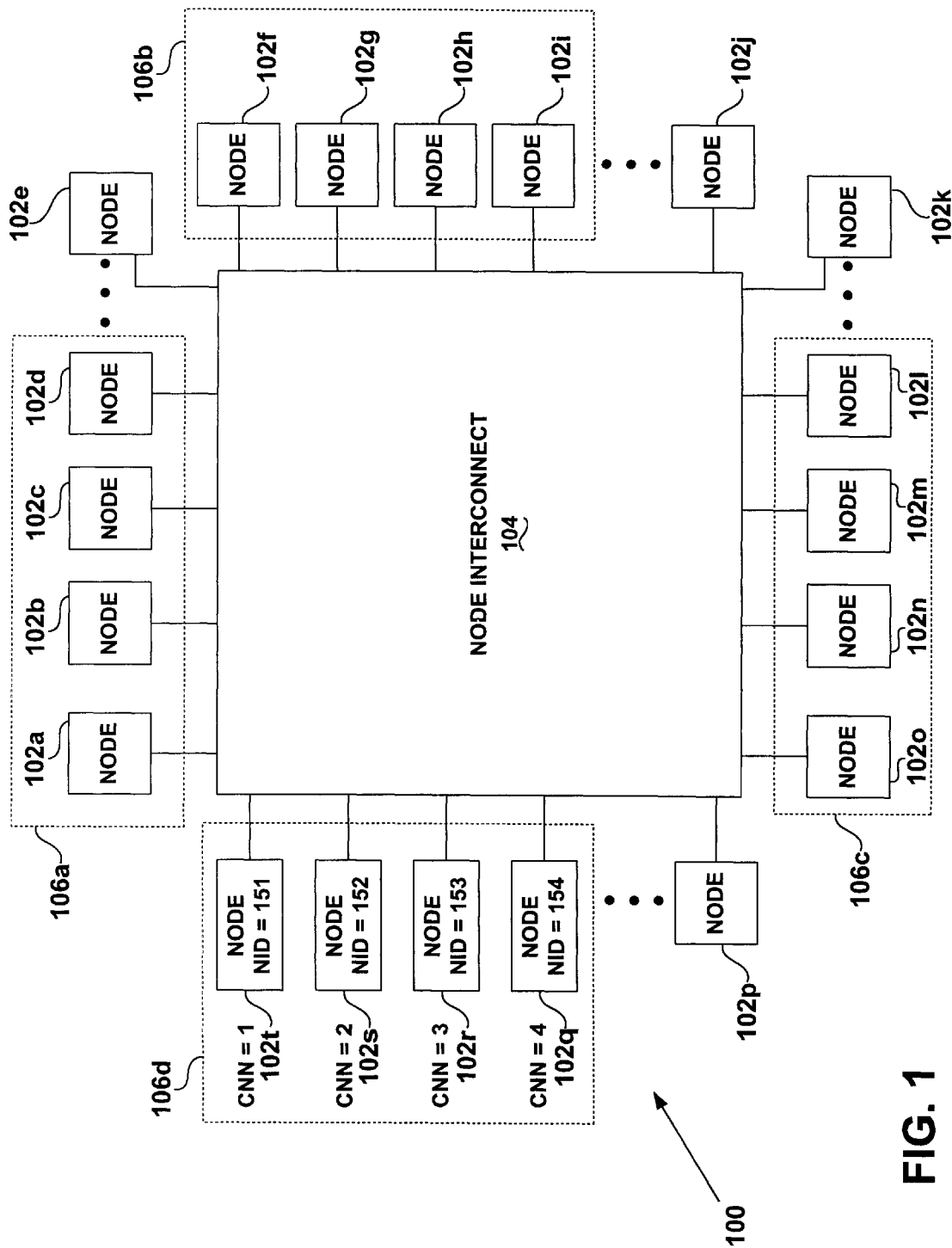
FIG. 1 is a functional block diagram of a computer system having multiple processor nodes according to the present invention.

FIG. 1 is a functional block diagram of a computer system 100 according to the invention, including multiple processor nodes 102a–t and a processor node interconnection 104 which provides point-to-point communication between the connected nodes. Each of the processor nodes 102a–t may be configured as a stand-alone computer system or be configured in combination with other processor nodes to form a computer system in which the processor nodes share memory. The term "site" is used to designate a group of processor nodes sharing a physical address space in memory. Selected processor nodes 102a–d, 102f–i, 102l–o, and 102q–t are respectively configured as sites 106a, 106b, 106c and 106d. Other processor nodes 102e, 102j, 102k, and 102p are also connected via interconnection 104, but do not share memory. Processor nodes in different sites communicate via message passing. For example, processor nodes in site 106a can communicate with processor nodes in other sites, e.g., processor node 102n in site 106c, by sending messages via interconnection 104. Each site typically runs a single copy of an operating system, similar to what could be run on a Symmetric Multiprocessor (SMP).

Figure 2:
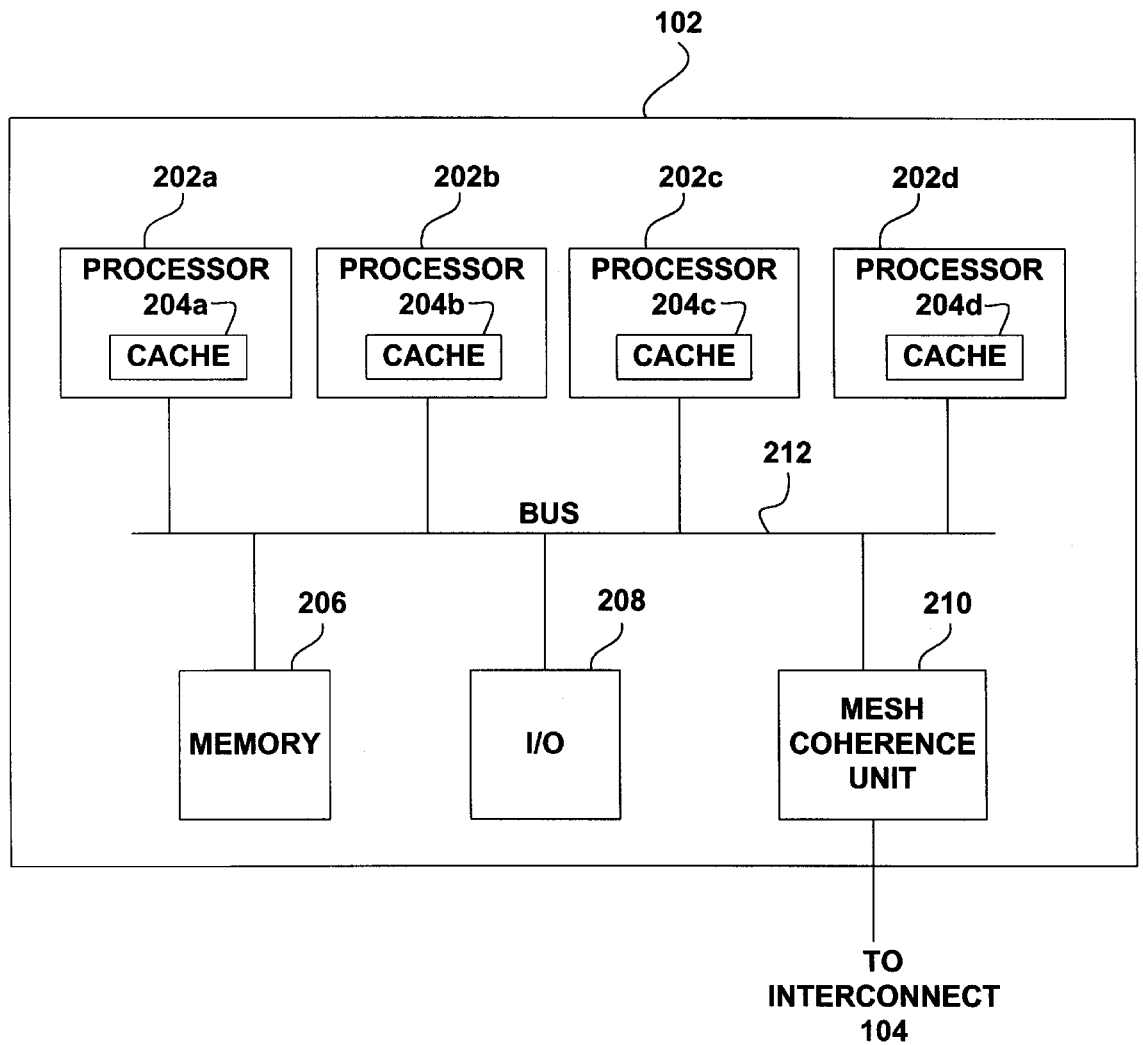
FIG. 2 is a functional block diagram of an example of a processor node from FIG. 1 which includes a memory subsystem, an input/output subsystem, a Mesh Coherence Unit (MCU) and processors having respective caches.

Cache coherence with integrated message passing and memory protection between processor nodes 102a–t are achieved with the invention as applied to the exemplary system 100. The processor nodes in a site, e.g., processor nodes 102a–d in site 106a, share a physical address memory space. In addition, each of the processor nodes may have multiple processors, each having a cache memory (FIG. 2). Thus, cache coherence must be maintained between caches of processors not only within a node, but also in different processor nodes. For example, caches in node 102a must be coherent with caches in nodes 102b–d.

The invention includes a memory protection mechanism which permits access to a shared physical memory address space for processor nodes inside a site and denies access for processor nodes outside a site. For example, processor node 102e may pass messages to processor node 102a. However, because processor node 102e is not within site 106a, processor node 102e may not perform memory access operations on the physical address space of site 106a.

The memory protection mechanism relies on node identifiers (NIDs) and coherence node numbers (CNNs) and a mapping between them. Each processor node in the system is given a NID that is unique system-wide. In addition, each processor node within a site is assigned a CNN that is unique within the site. Processor nodes in a site each keep a table that holds the mapping between CNNs and NIDs for all other processor nodes within that site. In system 100, site 106d has node 102t with NID=151, CNN=1, node 102s with NID=152, CNN=2, node 102r with NID=153, CNN=3, and node 102q with NID=154, CNN=4. Messages communicated between processor nodes always include the NID that identifies the source processor node. The receiving node uses its mapping table to determine whether the incoming message is from a processing node within the same site or not. If the source node site differs from the destination node site, memory access protections apply.

FIG. 2 is a functional block diagram of a processor node 102. Processor node 102 is exemplary of FIG. 1 processor nodes 102a–t and includes processors 202a–d each having a respective cache 204a–d, a memory subsystem 206, an input/output subsystem 208, and a mesh coherence unit (MCU) 210. Each of the functional units 202a–d, 206, 208, and 210 are connected to bus 212 for transmitting control, address, and data signals between the units. The mesh coherence unit 210 is connected to interconnection 104. The mesh coherence unit 210 coordinates inter-processor node cache coherence, inter-processor node message passing, and inter-processor node memory protection.

The processors 202a–d, memory subsystem 206, input/output subsystem 208, mesh coherence unit 210 and bus 212 represent one possible processor node implementation; for example, a different number of processors could be used.

Figure 3:
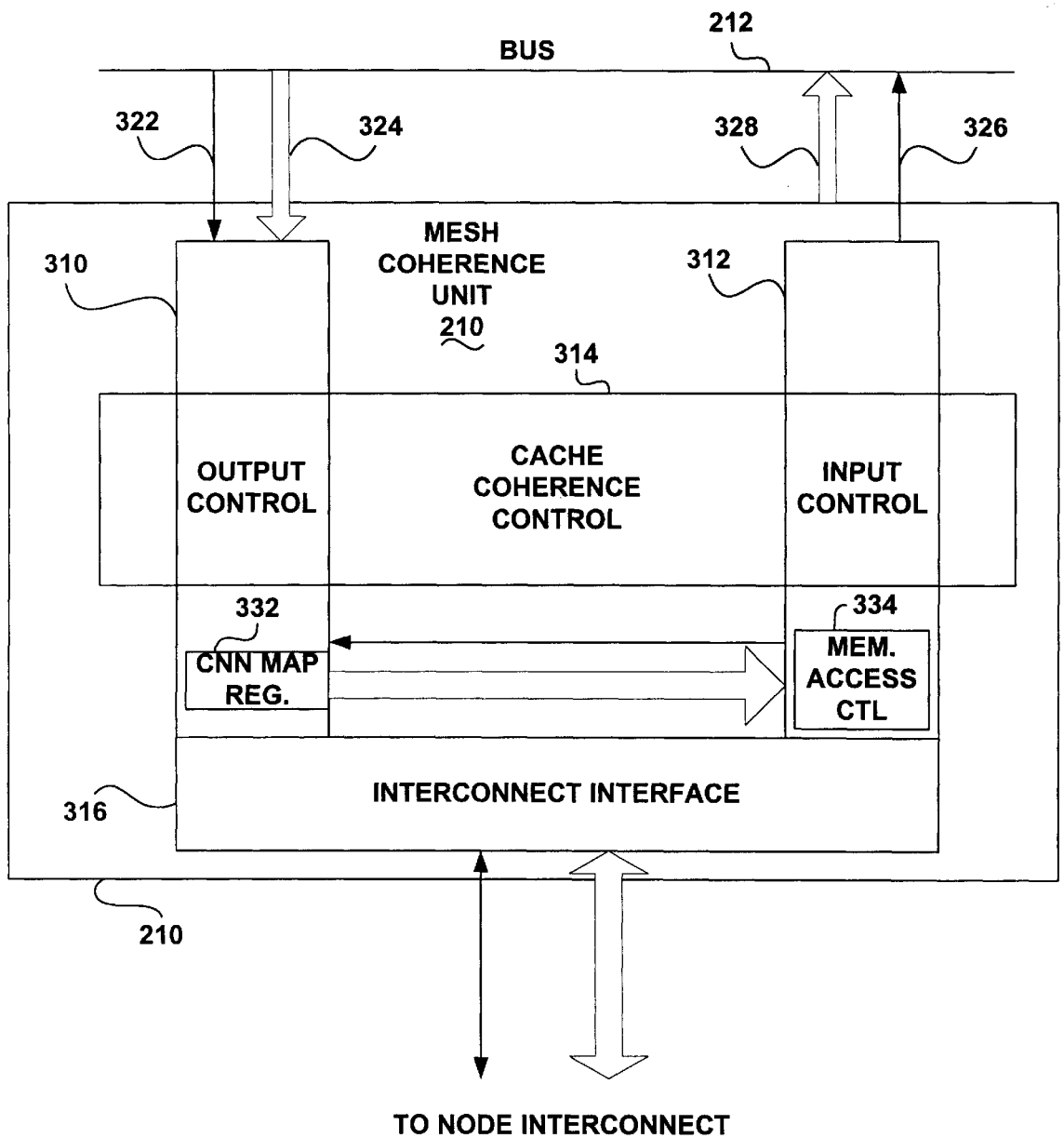
FIG. 3 is a block diagram of a Mesh Coherence Unit.

FIG. 3 is a block diagram of mesh coherence unit 210, which maintains inter-processor node cache coherency, supports message passing between processor nodes 102a–t, and protects against unauthorized memory accesses.

Mesh coherence unit 210 includes an output control element 310, an input control element 312, a cache coherence control element 314, and an interconnection interface 316. Output control element 310 includes a CNN map register 332, and input control element 312 includes a memory access control element 334. Output control element 310 receives control signals via line 322 and data signals via line 324 from bus 212, and transmits output messages to interconnection interface 316 for transmission to a designated processor node 102a–t. Similarly, input control element 312 receives messages from interconnection interface 316 and transmits control signals via line 326 and data signals via line 328 to bus 212 for delivery to a designated processor, e.g., 102a.

Cache coherence control element 314 maintains state information for cached memory locations. Referring again to FIG. 2, each processor node within a site 102 has memory subsystem 206 that is local to the processors within that node. Cache coherence control element 314 (FIG. 3) coordinates coherency for memory locations that are local relative to mesh coherence unit 210.

CNN map register 332 and memory access control element 334 use node identification numbers (NIDs), coherence node numbers (CNNs), and a mapping between them to provide memory protection between processor nodes. Each node 102 in system 100 is given a NID. Once a set of nodes is committed to share memory, they are each assigned a CNN, and all adopt a consistent mapping of CNNs to NIDs. With this mapping a processor node is able to tell whether an incoming message is from within the same coherence group (in which case it is completely unprotected) or is from outside the coherence group (in which case the shared-nothing protections apply). This allows processor nodes sharing memory and processor nodes sharing nothing to co-exist on the same interconnection.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A computer system comprising:
   an interconnection; and
   a plurality of processor nodes, each being connected to said interconnection and having at least one processor connected to a bus, one or more of said nodes constituting a site;
   each of the processor nodes having:
   a unique node identifier (NID);
   an output control element for controlling output of messages and memory access requests from said bus to said interconnection;
   a table for storing a mapping of coherence node numbers (CNNs) to NIDs; and
   a memory protection mechanism for allowing processor nodes inside a coherence group to share memories in said site and for forbidding processor nodes outside the coherence group to share said memories while co-existing on said interconnection, whereby once a set of nodes are committed to share memory, the set of nodes are each assigned a CNN and a consistent mapping of CNNs to NIDs is stored in the table therefore allowing a processor node to reference the table and determine whether an incoming message is from the same coherence group.

2. The computer system of claim 1 wherein processors which share memories perform memory access operations on the physical address space of said memories.

3. The computer system of claim 1 wherein said interconnection is used for both cache coherence and message passing protocols, thereby increasing the rate at which messages may be exchanged.

4. The computer system of claim 1 wherein cache coherence is maintained both within a processor node and within different processor nodes.

5. The computer system of claim 1 wherein:

said plurality of processor nodes are partitionable into multi-processor node systems, at least one multi-processor node system having distributed shared memory, whereby memory of a first processor node in a multi-processor node system is accessible to a second processor node in said multi-processor node system, and memory of said second processor node is accessible to said first processor node; and an input control element of said first processor node includes a memory access control element, responsive to memory access requests from said interconnection, for selectively denying a memory access request from said interconnection, wherein said memory access control element uses node identification numbers (NIDs), coherence node numbers (CNNs), and a mapping between them to allow a processor node to tell whether an incoming message is from within a coherence group.

6. A computer system comprising:

a plurality of processor nodes connected to an interconnection, at least one processor node having:

memory connected to a bus;

a plurality of processors connected to said bus;

at least one processor having a respective cache;

a unique node identifier; and at least one mesh coherence unit, having:

a table for storing a mapping of coherence node numbers (CNNs) to NIDs, an output control element for controlling output of messages and memory access requests from said bus to said interconnection, an input control element for controlling input of messages and memory access requests from said interconnection to said bus, and a cache coherence control element connected to said output control element and to said input control element for coordinating inter-processor node cache coherence; wherein processors in a site share memories in said site and processors outside said site do not share said memories, whereby once a set of processor nodes are committed to share memory, the set of processor nodes are each assigned a CNN and a consistent mapping of CNNs to NIDs is stored in the table, therefore allowing a processor node to reference the table and determine whether an incoming message is from the same site.

7. The computer system of claim 6 wherein said interconnection is useful for both cache coherence and message passing protocols, thereby increasing the rate at which messages may be exchanged.

8. The computer system of claim 6 wherein cache coherence is maintained both within a processor node and within different processor nodes.

* * * * *